(12) United States Patent
Noma

(10) Patent No.: US 7,801,900 B2
(45) Date of Patent: Sep. 21, 2010

(54) CONTENTS DATA REPRODUCTION APPARATUS AND CONTENTS DATA REPRODUCTION METHOD

(75) Inventor: Hideki Noma, Kanagawa (JP)

(73) Assignee: SONY Corporation, Tokyo (JP)

( * ) Notice: Subject to any disclaimer, the term of this patent is extended or adjusted under 35 U.S.C. 154(b) by 827 days.

(21) Appl. No.: 11/477,399

(22) Filed: Jun. 30, 2006

(65) Prior Publication Data

US 2007/0008844 A1     Jan. 11, 2007

(30) Foreign Application Priority Data

Jul. 6, 2005     (JP)     ............... P2005-197978

(51) Int. Cl.
*G06F 17/00*     (2006.01)
(52) U.S. Cl. ....................... 707/748; 707/694
(58) Field of Classification Search ............... None
See application file for complete search history.

(56) References Cited

U.S. PATENT DOCUMENTS

| 6,526,411 | B1* | 2/2003 | Ward ........................... 707/102 |
| 6,587,403 | B1* | 7/2003 | Keller et al. ............... 369/30.06 |
| 6,665,797 | B1* | 12/2003 | Keung ......................... 713/193 |
| 2003/0089218 | A1* | 5/2003 | Gang et al. ................... 84/615 |
| 2003/0236582 | A1* | 12/2003 | Zamir et al. ................... 700/94 |
| 2004/0224638 | A1* | 11/2004 | Fadell et al. ................ 455/66.1 |
| 2005/0210419 | A1* | 9/2005 | Kela et al. ................... 715/863 |
| 2006/0060068 | A1* | 3/2006 | Hwang et al. ................. 84/615 |
| 2006/0111621 | A1* | 5/2006 | Coppi et al. ................. 600/300 |
| 2006/0167576 | A1* | 7/2006 | Rosenberg ................... 700/94 |
| 2006/0167943 | A1* | 7/2006 | Rosenberg ................ 707/104.1 |
| 2007/0033012 | A1* | 2/2007 | Rosenberg ................... 704/206 |
| 2007/0125852 | A1* | 6/2007 | Rosenberg ................... 235/435 |

FOREIGN PATENT DOCUMENTS

| JP | 2004-213836 | 7/2004 |
| JP | 2005-038541 | 2/2005 |
| KR | 10-2004-00677862 | 3/2006 |
| KR | 10-2005-0030528 | 8/2006 |

OTHER PUBLICATIONS

Sam Costello, Defining Part Shuffle, a feature of iTunes.*
Apple inc., iPod User's Guide, 2005.*
http://www.apple.com/ipodtouch/features/music.html (as of Apr. 23, 2010) (1 page).

* cited by examiner

*Primary Examiner*—Charles Rones
*Assistant Examiner*—Kurt Mueller
(74) *Attorney, Agent, or Firm*—Finnegan, Henderson, Farabow, Garrett & Dunner LLP

(57) ABSTRACT

The present invention facilitates operations of updating, altering and/or otherwise recomposing the reproduction list of contents data prepared according to the frequency of reproduction, the priority of reproduction, the preference of the user and so on. There is provided a contents data reproduction apparatus for reproducing contents data, which includes a detecting section that detects the external force, a weighting information generating section that generates weighting information, a memory section that stores the weighting information, a reproduction control section that composes a reproduction list of the contents data, a reproduction section that reads out the contents data and reproducing them, and a display section that visibly displays the reproduction list, the reproduction control section recomposing the reproduction list of the contents data, referring to the weighting information, according to the outcome of detection of the detecting section and visibly displaying the reproduction list on the display section.

11 Claims, 9 Drawing Sheets

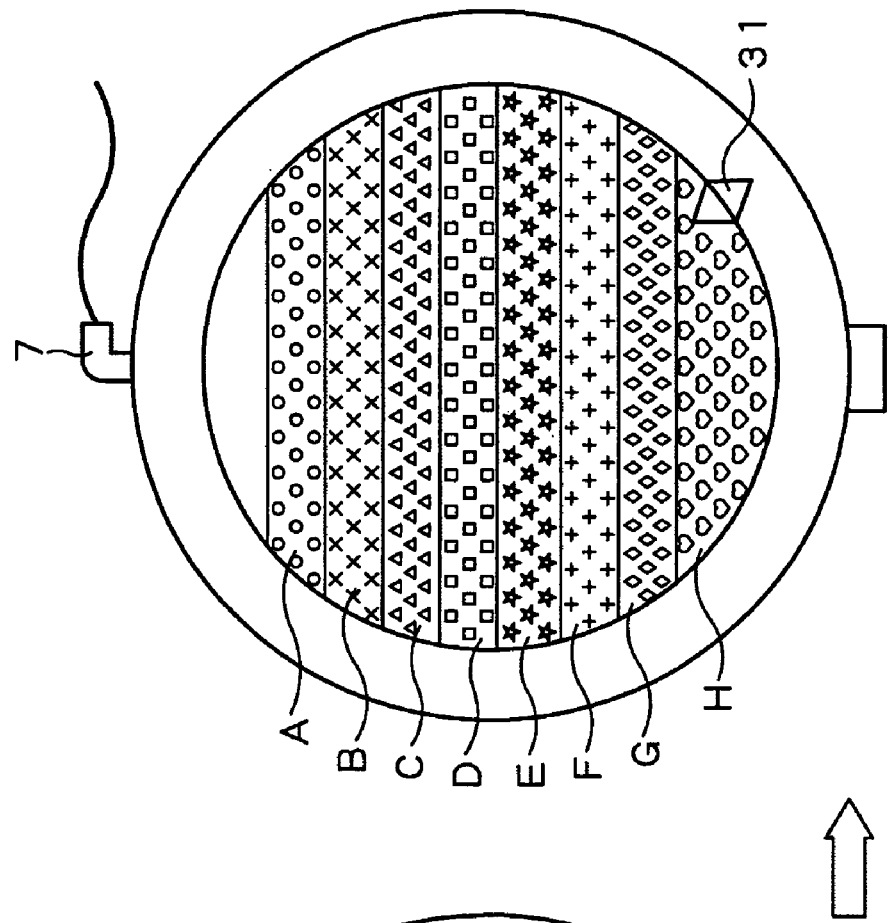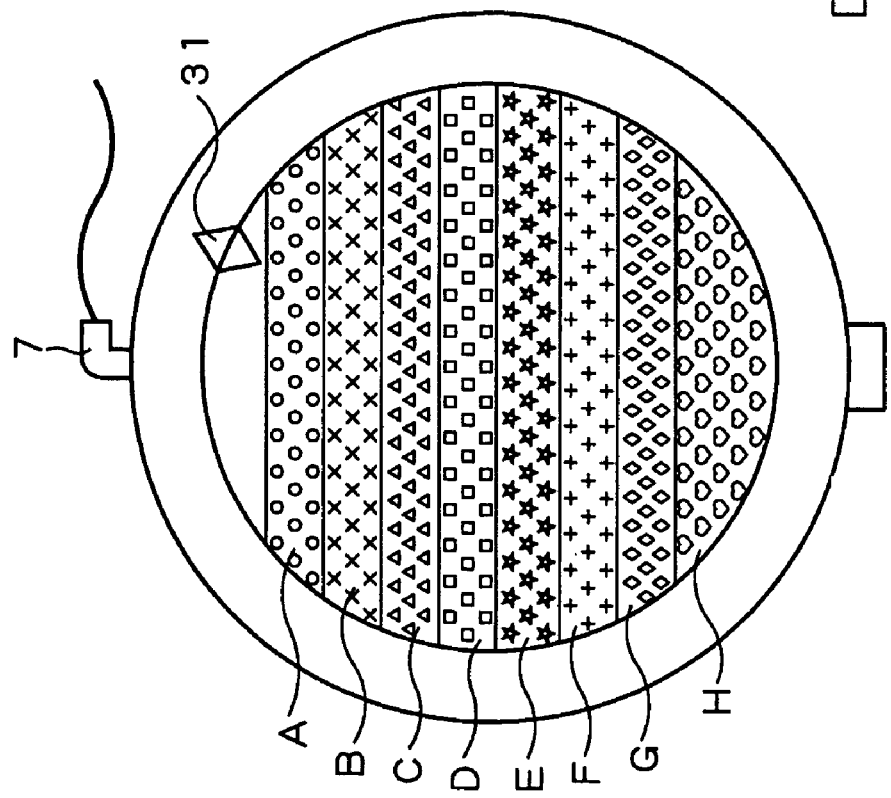
FIG.8

Shaken in positive direction

Shaken in transversal direction

Shaken in opposite direction

US 7,801,900 B2

CONTENTS DATA REPRODUCTION APPARATUS AND CONTENTS DATA REPRODUCTION METHOD

CROSS REFERENCES TO RELATED APPLICATIONS

The present invention contains subject matter related to Japanese Patent Application JP 2005-197978 filed in the Japanese Patent Office on Jul. 6, 2005, the entire contents of which being incorporated herein by reference.

BACKGROUND OF THE INVENTION

1. Field of the Invention

This invention relates to a contents data reproduction apparatus and a method to be used for such an apparatus for the purpose of reproducing contents data from a recording medium storing them.

2. Description of the Related Art

Recording/reproduction apparatus adapted to record data to and/or reproduce data from a recording medium such as a CD (compact disc), an MD (mini disc) (trademark) or a DVD (digital versatile disc), an HDD (hard disc drive), apparatus adapted to record data to and/or reproduce data from a semiconductor memory and recording/reproduction apparatus including a semiconductor memory can randomly access the contents data. Therefore, such apparatus are equipped with a reproduction feature of not reproducing contents data such as music data and image data (including moving image data) in the default order of reproductions or the order of recordings but incidentally reproducing contents in a manner like "shuffled reproductions" or "random reproductions". Such apparatus can also reproduce contents data according to the sequence specified by the user as "programmed reproduction".

As recording mediums become to be able to store more and more contents, it is difficult to manage the recorded files (contents data). To cope with such a situation, there have been proposed techniques of moving data in a temporary memory from which data can be taken out according to the frequency of use of the data and deleting data that are not frequently used and those of looking into the tendency of selection of music data of the user and preparing and presenting favorite contents data of the user (see, for example, Patent Document 1: Jpn. Pat. Appln. Laid-Open Publication No. 2004-213836).

Additionally, techniques that make it possible to reproduce contents data so as to reflect the preference of the user by orderly arranging music data in a hard disc according to the evaluation points given and input directly by the user and reproducing contents according to the evaluation points have also been proposed (see, for example, Patent Document 2: Jpn. Pat. Appln. Laid-Open Publication No. 2005-38541).

SUMMARY OF THE INVENTION

In the case of the technique for providing contents having high evaluation points with priority as a reproduction feature employed in the past, the contents that are reproduced frequently are apt to be set to reflect the preference of the user and lose flexibility. Then, the advantage of fortuitousness and haphazardness of "shuffled reproductions" and "random reproductions" becomes weak. Additionally, while the above listed techniques aim at not deleting contents that are reproduced only scarcely, contents that are given low evaluation points probably will not be reproduced at all.

In view of the above identified circumstances, it is therefore desirable to provide a contents data reproduction apparatus and a contents data reproduction method that facilitate of updating, altering and/or otherwise recomposing the reproduction list of contents data prepared according to the frequency of reproduction, the priority of reproduction, the preference of the user and so on.

According to an embodiment of the present invention, there is provided a contents data reproduction apparatus for reproducing contents data from a contained recording medium or a removably fitted recording medium storing contents data, the apparatus including: a detecting section that detects the external force applied to the contents data reproduction apparatus; a weighting information generating means for generating weighting information including contents information relating to the contents data stored in the recording medium and information on the use of the contents data and indicating the reproduction priority for the contents data; a memory section that stores the weighting information generated for the contents data; a reproduction control section that composes a reproduction list of the contents data according to the weighting information stored in the memory section; a reproduction section that reads out the contents data stored in the recording medium and reproducing them according to the reproduction list; and a display section that visibly displays the reproduction list; the reproduction control section recomposing the reproduction list of the contents data, referring to the weighting information, according to the outcome of detection of the detecting section.

The reproduction list displayed on the display section of a contents data reproduction apparatus according to the embodiment of the invention has a hierarchical structure and contents data having more heavily weighted information are arranged in upper layers.

The reproduction control section of a contents data reproduction apparatus according to the embodiment of the invention is adapted to introduce random values unrelated to the weighting information depending on the outcome of detection of the detecting section and recompose the reproduction list according to the random values. After recomposing the reproduction list, the reproduction control section updates the recomposed reproduction list by changing the random values as a function of the elapsed time and restores the reproduction list according to the original weighting information after a predetermined period of time. The time period until restoration is so defined that it is shorter for contents data arranged on upper layers of the reproduction list according to the original weighting information.

The weighting information generating means of a contents data reproduction apparatus according to the embodiment of the invention is adapted to change the weighting information by a predetermined value and use it as new weighting information each time when the entire contents data have been reproduced or when a part of the contents data has been reproduced, the predetermined value being differentiated between the two situations. The weighting information generating means changes the weighting information by a value that is predetermined as a function of the duration of application of or the intensity of the external force as detected by the detecting section.

According to an embodiment of the present invention, there is also provided a contents data reproduction method including: a step of detecting the duration of application of external force or the intensity of external force by means of a sensor for detecting the external force applied to a contents data reproduction apparatus; a weighting information generating step of generating weighting information including contents information relating to the contents data stored in a recording medium and information on the use of the contents data and indicating the reproduction priority for the contents data; a reproduction control step of composing a reproduction list for the contents data according to the weighting information generated for the contents data and stored in the memory storing the weighting information; a reproduction step of reading out and reproducing the contents data stored in the recording medium according to the reproduction list; and a display step of visibly displaying the reproduction list on a display section; the reproduction control step being adapted to compose the reproduction list of the contents data, referring to the weighting information, according to the outcome of detection of the detecting section.

Thus, according to the present invention, a reproduction list of contents data is composed according to the weighting information including contents information relating to the contents data and information on the use of the contents data and indicating the reproduction priority for the contents data and visibly displayed and then recomposed by detecting the external force, if any, applied to the apparatus main body of the contents data reproduction apparatus. Therefore, for example, the order of reproducing tunes of music can be rearranged when the user "shakes" the apparatus main body. With the above-described arrangement, it is possible for the user to easily recompose the reproduction list for reproducing the contents data recorded in the apparatus by means of an intuitive action with which the user may feel as if he or she were agitating the inside of the apparatus. Additionally, according to the present invention, since it is possible to visibly display the reproduction list for reproducing the contents data recorded in the recording medium, the user can operate the contents data reproduction apparatus in a more intuitive manner.

BRIEF DESCRIPTION OF THE DRAWINGS

FIG. 8 is a schematic illustration of a reproduction list that can be displayed in still another display mode of the contents data reproduction apparatus of FIG. 1A;

DETAILED DESCRIPTION OF THE PREFERRED EMBODIMENTS

Figure 1:
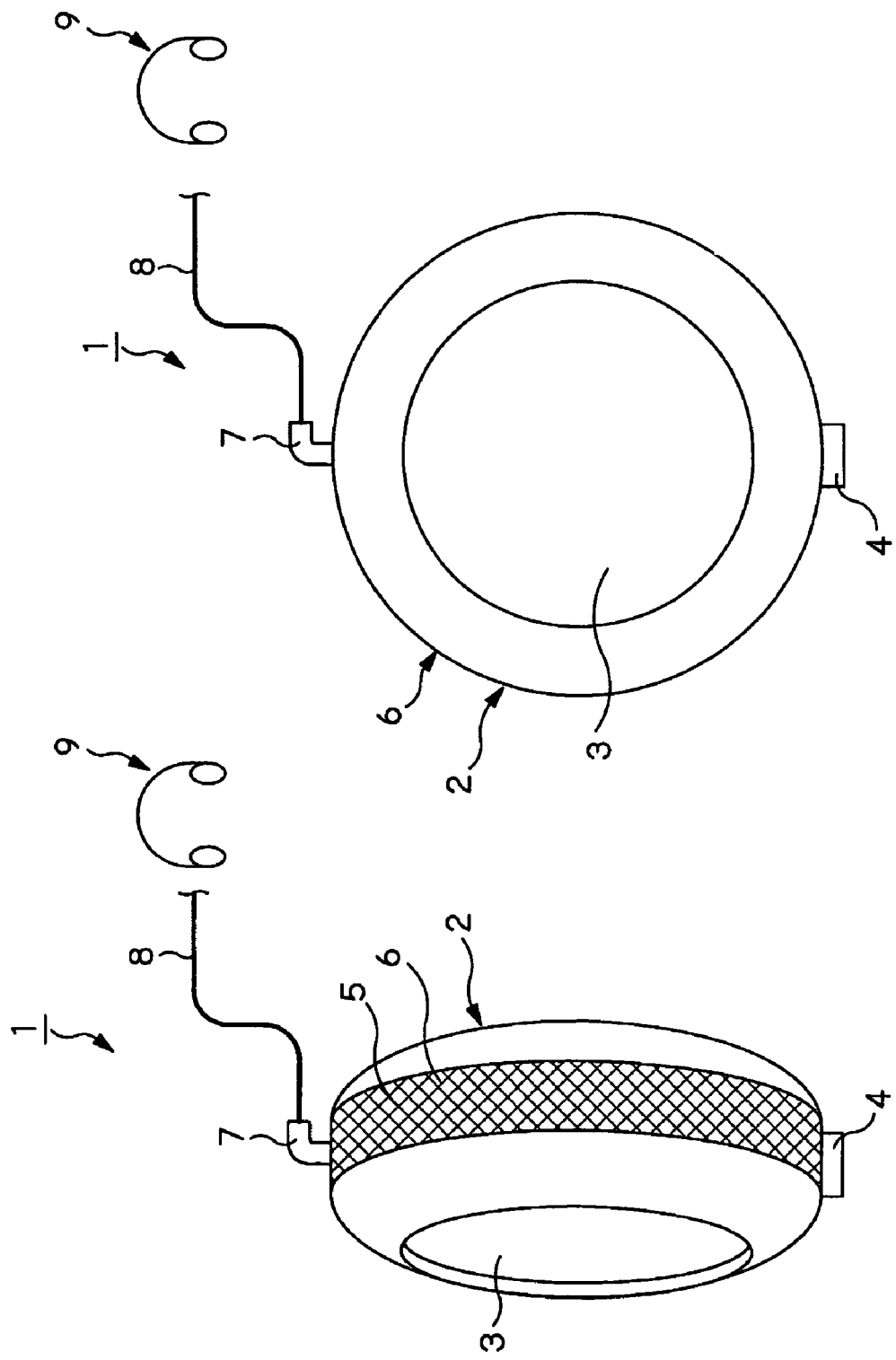
FIG. 1A is a schematic perspective view of contents data reproduction apparatus according to an embodiment of the present invention.
FIG. 1B is a schematic front view of the contents data reproduction apparatus of FIG. 1A.

Now, the present invention will be described in greater detail by referring to the accompanying drawings that schematically illustrate a preferred embodiment of the invention. The illustrated embodiment of contents data reproduction apparatus is equipped with a randomly accessible recording medium that is contained in or removably fitted to the apparatus and can at least reproduce the contents data recorded in the recording medium. The embodiment of contents data reproduction apparatus may be a portable apparatus adapted to mainly reproduce pieces of music.

FIGS. 1A and 1B schematically illustrate the appearance of the embodiment of contents data reproduction apparatus 1. The contents data reproduction apparatus 1 includes a display section 3 that displays information on contents data and information necessary for operating the main body of the apparatus and a main body section 2 where an operation input section 4 is arranged for operating the apparatus. The main body section 2 is substantially realized in the form of a disc having a predetermined thickness and the display section 3 is arranged on the top surface of the main body section 2 so as to show a profile that substantially agrees with the lateral profile of the main body section. The operation input section 4 is made to show a profile similar to that of a cap and adapted to operate as a cap that can be opened and closed. Thus, predetermined operation inputs are realized as the operation input section 4 is opened and closed. Additionally, the section 4 may include input buttons of a pressing type or a contact detection type.

The contents data reproduction apparatus 1 is so structured that the main body section 2 can be rotated relative to lateral surface section 5 thereof. Thus, the main body section 2 takes a role of a rotary operator 6 that is adapted to realize a predetermined operation input by the extent by which the main body section 2 is rotated relative to the lateral surface section 5. The contents data reproduction apparatus 1 is equipped at a spot on the lateral surface section 5 with a headphone jack 7. A headphone 9 that operates as sound output section is connected to the headphone jack 7 by way of a connection cord 8. Although not shown, a connection section is also provided so as to connect some other output device or some other reproduction apparatus to the contents data reproduction apparatus 1. The profile of the main body section 2 and that of the display section 3 may be modified without departing from the scope of the present invention. In other words, the profile of the main body section 2 and that of the display section 3 are not limited to those described above.

Figure 2:
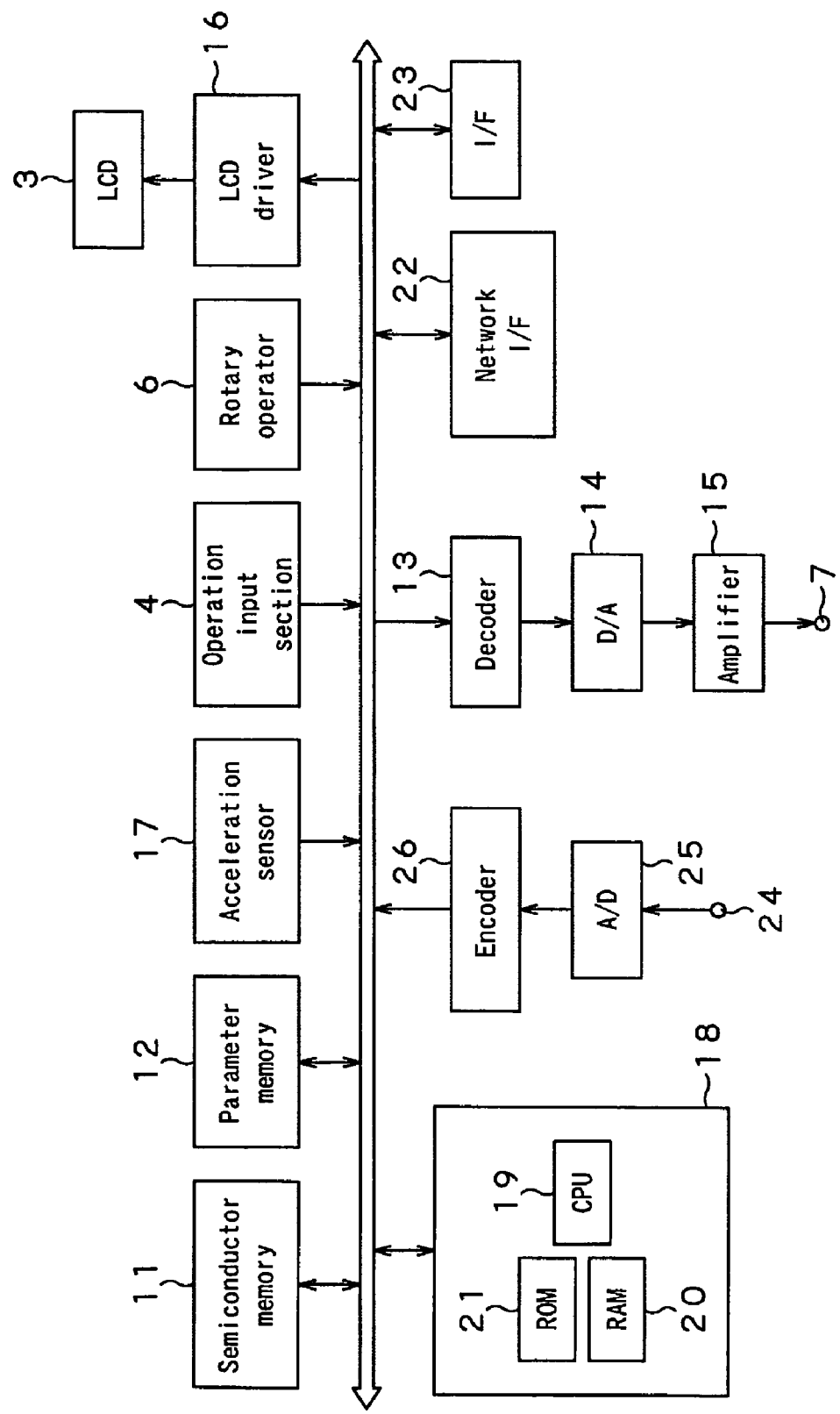
FIG. 2 is a schematic block diagram of the contents data reproduction apparatus of FIG. 1A.

FIG. 2 illustrates the specific configuration of the contents data reproduction apparatus 1. Referring to FIG. 2, the components that correspond respectively to those of FIG. 1 are denoted by the same reference symbols. The contents data reproduction apparatus 1 includes a semiconductor memory 11 that is a recording medium for storing contents data and a parameter memory 12 that stores weighting information including contents information relating to the contents data stored in the semiconductor memory 11 and information on the use of the contents data and indicating the reproduction priority for the contents data. It is assumed here that this embodiment is adapted to deal with audio contents data.

The contents data reproduction apparatus 1 additionally includes a decoder 13 that obtains an audio signal by decoding audio data prepared in a predetermined format, a D/A converter 14 that converts the decoded audio signal into an analog signal and an amplifier 15 that amplifies the analog signal. The output of the amplifier 15 is supplied to the headphone jack 7 of FIG. 1.

The contents data reproduction apparatus 1 further includes a display section 3 that is a small liquid crystal display (LCD) for displaying a reproduction list and other pieces of information as will be described hereinafter and an LCD driver 16 that drives the LCD as well as an operation input section 4 that is to be used by the user for operation inputs by the user and a rotary operator 6 as described above by referring to FIG. 1. Operation signals are supplied from the operation input section 4 and the rotary operator 6.

The contents data reproduction apparatus 1 still further includes an acceleration sensor 17 that detects the external force applied to the apparatus itself. The acceleration sensor 17 is an acceleration sensor that can detect the direction of a motion of the contents data reproduction apparatus relative to an xyz-axes coordinate system having its origin substantially at the center of the apparatus. When the detected value exceeds a certain threshold value, the acceleration sensor 17 recognizes it as external force applied to the apparatus main body of the contents data reproduction apparatus 1. When the duration of the applied external force exceeds a predetermined period of time, the acceleration sensor 17 recognizes that the application of the external force is continued for that period of time. Thus, the acceleration sensor 17 provides information on the duration during which an external force is applied to the apparatus main body and the intensity of the external force. If oscillation is produced by the external force, the intensity of oscillation can be determined by seeing the range of predetermined threshold values in which the average output of the detected values of the acceleration sensor 17 is found. From the outcome of detection of the acceleration sensor 17, it is possible to find out if the applied external force is caused by walking, running or an intentional swinging motion typically from the rhythm of the detected values and the pattern of oscillation intensities. It is also possible to respectively assign the xyz-axes to different items and selectively input values for the items.

The above-described components are comprehensively controlled by a control section 18. The control section 18 includes a CPU 19, a RAM 20 that provides a working area for the CPU 19 and a ROM 21 storing programs. The control section 18 generates weighting information that indicates the reproduction priority of each set of contents data stored in the semiconductor memory 11 and prepares or composes a reproduction list of the contents data according to the weighting information stored in the parameter memory 12.

The contents data reproduction apparatus 1 further includes a network interface (to be referred to as network I/F hereinafter) 22 for connecting the apparatus 1 to a network formed by the apparatus 1 and other electronic apparatus and a connection interface (to be referred to as connection I/F hereinafter) 23 such as USB. The network may be a small area network such as a home network for short distance wireless communications, which may include infrared communications and/or Bluetooth (trademark) communications, a wired or wireless LAN or a large area network such as the Internet formed by connecting such small area networks.

The contents data reproduction apparatus 1 may additionally include an input terminal 24 for receiving as input audio signals in the analog format from external reproduction apparatus, an A/D converter 25 for converting the audio signals in the analog format supplied from the input terminal 24 into signals in the digital format and an encoder 26 for encoding audio data in the digital format.

The semiconductor memory 11 for storing audio data may be a removable memory device such as a SmartMedia (trademark) or a Memory Stick (trademark). Alternatively, the contents data reproduction apparatus 1 may include a removable optical disc or the like in addition to the above-described memory contained in the apparatus. The memories including the semiconductor memory 11 and the parameter memory 12 may be HDDs (hard disc drives).

Any of various compression coding techniques is applicable to the present invention for the purpose of recoding contents data. Such techniques include, to name a few, the ATRAC (adaptive transform acoustic coding) system for compression coding of audio data employing both translation coding and entropy coding and utilizing the masking effect resorting to the nature of the auditory sense and the frequency dependency of the minimum limit of audibility, the MPEG (moving picture experts group) system, the PASC (precision adaptive sub-band coding) system and known general purpose encode algorithms.

Figure 3:
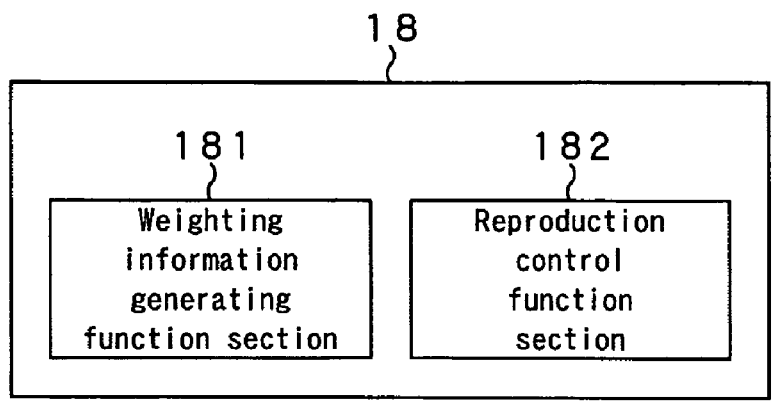
FIG. 3 is a schematic illustration of the functional components of the control section of the contents data reproduction apparatus of FIG. 1A.

FIG. 3 is a schematic illustration of the functional components of the control section 18. Referring to FIG. 3, the control section 18 includes a weighting information generating function section 181 for generating weighting information that indicates the reproduction priority of the contents data stored in the semiconductor memory 11 according to the contents information relating to the stored contents data such as the genre, the playing artists and the number of times of reproduction in the past of each set of contents data and the state of reproduction of the contents data reproduction apparatus such as fast winding or rewinding and a reproduction control function section 182 for composing reproduction lists of contents data according to the weighting information stored in the parameter memory 12. The reproduction control function section 182 recomposes the current reproduction list according to the weighting information in response to the outcome of detecting of the acceleration sensor 17. The reproduction list is visibly displayed on the LCD 3.

Each time all the contents data are reproduced or when the contents data are partly reproduced, the weighting information generating function section 181 generates new weighting information by altering the weighting information by predetermined values. In other words, the weighting information generating function section 181 updates the parameters that function as weighting information according to the state of reproduction of the contents data.

The reproduction control function section 182 introduces random values that are not related to the original parameters according to the outcome of detection of the acceleration sensor 17 and recomposes the reproduction list according to the random values. Random values as used herein are values that express positional information for indicating the provided plurality of layers of the reproduction list. The reproduction control function section 182 normally prepares a reproduction list that divides the audio contents into layers according to the parameters. In this embodiment, the contents data in the recording medium are regarded as objects that are floating or accumulated in liquid. Therefore, in the reproduction list, contents data having higher reproduction priority are regarded as objects showing a small specific gravity and hence arranged in upper layers. The reproduction control function section 182 arranges contents data having higher reproduction priority in upper layers of the reproduction list according to the parameters generated by the weighting information generating function section 182.

In this way, when external force is applied to the apparatus main body of the contents data reproduction apparatus 1, the apparatus detects it by means of the weighting information generating function section 181 and the reproduction control function section 182. Then, it can randomly change the parameters generated by the weighting information generating function section 182 and stored in the parameter memory 12 and prepare a reproduction list once again according to the changed parameters. Thus, when the user "shakes" the contents data reproduction apparatus 1 for example, the parameters are temporarily changed and the reproduction list is recomposed so that contents data that are normally found in lower layers of the reproduction list may be temporarily arranged in upper layers. Then, it is possible for the user to easily recompose the reproduction list for reproducing the contents data recorded in the apparatus main body by means of an intuitive action of shaking with which the user may feel as if he or she were agitating the inside of the apparatus.

Now, the shuffling/reproduction feature of the contents data reproduction apparatus 1 will be described by way of a specific example.

The contents data reproduction apparatus 1 imports audio contents from a personal computer, stand-type audio recording/reproduction apparatus and/or a network by way of a network I/F 23, a connection I/F 24 and/or an input terminal 24 and prepares a reproduction list. Immediately after importing the audio contents, the imported audio contents can be reproduced without any particularly designed process because they do not have any reproduction history.

A specific code such as an ISRC (International Standard Recording Code) may be assigned to each set of audio contents data as contents ID. Then, contents-related information (to be referred to as contents information hereinafter) can be managed by using contents IDs. Thus, contents having no reproduction history may be reproduced according to the contents information referred to by their contents IDs. Techniques that can be used for reproducing contents data having no reproduction history include those of reproducing contents data according to the categories for sorting contents data such as genres, artists, albums and those of reproducing the sets of contents data of each genre, each artist or each album in the alphabetical order or inverse alphabetical order. If the contents data reproduction apparatus 1 does not have any reproduction history but can import a reproduction list such as a reproduction list prepared according to the technique employed in the past, it is possible to reproduce contents data according to an externally supplied reproduction list. Note, however, if such is the case, the imported reproduction list is composed so as to provide a new reproduction list in the contents data reproduction apparatus 1 by means of the method that will be described hereinafter.

Generation of the Specific Gravity of Each Set of Contents Data

As pointed out above, weighting information is information based on contents information on the contents to be reproduced and information on the use of the contents data and indexes, each indicating the reproduction priority of a set of contents data. In this specific example, the contents data reproduction apparatus 1 prepares a reproduction list having a hierarchical structure where the contents data in the recording medium are regarded as objects floating or accumulated in liquid. The weighting information that indicates the reproduction priority of each set of contents refers to "the specific gravity" of the set of contents.

The operation by the weighting information generating function section 182 of weighting each set of contents according to the reproduction history thereof is equivalent to an operation of updating the specific gravity of the set of contents. In this specific example, a value within the range from 0 to 9 is provided to indicate a specific gravity and 5 is selected as initial specific gravity. As pointed out above, a parameter of 5 is uniformly assigned to all the imported sets of contents at the time when they are imported.

Then, the weighting information generating function section 182 changes the parameter of each set of contents when the set of contents is reproduced according to the reproduction history and the reproduction status thereof including the title of the set of contents, or the tune, the clock time of the reproduction, the number of times of reproduction, the genre of reproduction, the progress of reproduction (if the entire tune was listened to, skipped on the way or repeatedly listened, etc.) and the reproduction history showing that the sensor detected something when it was being reproduced (e.g., the user was walking or was walking but stopped, was running, etc.). If, for example, +0 is given to the parameter of a set of contents, or a tune, when the set of contents is reproduced properly and entirely from the beginning to the end thereof, +0.5 is given when the tune is skipped, −0.1 is given when the tune is reproduced repeatedly and −0.5 is given when the tune is directly selected by a user operation. The set of audio contents that is selected by an operation of the user is referred to as salvaged tune.

Additionally, −0.2 may be given to the parameter of a tune when the number of times by which the tune is reproduced repeatedly exceeds a predetermined value. Similarly, additionally values may be given to the parameter of a tune according to the status of reproduction of the tune in such a way +0.1 is added to the tune when the number of times by which the tune is listened to the end thereof exceeds a predetermined value and −0.1 is given to a tune when the number of times by which the tune is skipped exceeds a predetermined value for the parameter. Then, the parameter of each set of audio contents, or tune, may be increased or decreased depending on if the tune is played by an artist who is a favorite of the user or whom the user does not like, if the tune belongs to the genre that is a favorite of the user or that the user does not like and so on. In this way, the weighting information generating function section 182 prepares a reproduction list each time the parameter of a tune is updated in order to make the list reflect the changed specific gravities of the imported sets of tunes.

The weighting information generating function section 182 may change the parameter of each set of audio contents according to the clock time when it is reproduced. For example, the weighting information generating function section 182 may store the clock time when a set of audio contents is reproduced and if the clock time when it was reproduced in the past is closest to the current clock time, the specific gravity is reduced to treat it as a tune for the current clock time. More specifically, −0.2 may be given to the parameter if the clock time at which the tune was reproduced last time is within +1 hour from the current clock time and −0.1 may be given to the parameter if the clock time at which the tune was reproduce last time is within ±2 hours from the current clock time. Similarly, +0.1 may be given to the parameter if the clock time at which the tune was reproduced last time has nothing to do with the current clock time.

The weighting information generating function section 182 can also change the parameter of a tune according to the outcome of detection of the acceleration sensor 17. For example, −0.1 may be given to the parameter of a tune if the acceleration sensor 17 detected external force at the time of the last reproduction of the tune and detects similar external force at the current reproduction of the tune. Similarly, +0.1 may be given to the parameter of a tune if what was detected at the last reproduction does not match with what is detected at the current reproduction of the tune or nothing is detected at the current reproduction of the tune. Then, the parameter can be made to reflect the user's action or motion, which may be the motion of the user who is walking or running while listening to the tune.

Additionally, the weighting information generating function section 182 attenuates (to be also referred to "effloresces" hereinafter) the generated parameter according to an element such as time period. For example, if a predetermined period of time, e.g., two weeks, have not passed since a set of audio contents was imported or released, the set of audio contents may be referred to as "new release". If two weeks have passed but a month has not passed since a set of audio contents was imported or released, the set of audio contents may be referred to as "still new release". If a month has passed since a set of audio contents was imported or released, the set of audio contents may be referred to as "old release". If a month has passed since the last reproduction of a set of audio contents, the set of audio contents may be referred to as "effloresced release". If a predetermined period of time has passed since a set of audio contents was imported or released and the set of contents has been reproduced for a large number of times, the set of contents may be referred to as "tired release". The parameter of any of such sets of audio contents is changed accordingly. Assume here, for example, +0 is given to the parameter of a new release and also +0 is given to the parameter of a still new release, while +1/week is given to the parameter of old release and +2/week is given to the parameter of a "tired release". With this arrangement, it is possible to give rise to a convection of audio contents in the memory space according to the time period since each set of audio contents is imported.

As described above, the contents data reproduction apparatus 1 may update the reproduction list at predetermined timing according to the parameter given to each set of audio contents under predetermined conditions. It may be appropriate to select the time when the contents data reproduction apparatus 1 is activated or when it is driven to start reproducing contents data according to the reproduction list for such timing. However, if the contents data are reproduced continuously for a long time and the parameters are updated during the reproduction so that the specific gravities are being changed almost incessantly, the reproduction list may be updated periodically with a short cycle time. The order in which sets of audio contents are reproduced may be determined according to "the weight of contents" computed by multiplying the parameter of each set of audio contents by the data volume of the set of audio contents. For example, the weight of contents of a tune may be defined as "specific gravity×length of tune". Then, a tune whose reproduction time is long has a large data volume so that such a tune has a large weight of contents and is apt to fall into a lower layer in the hierarchical memory space.

The parameter values and the timings for changing the reproduction list as cited above are only examples and the present invention is by no means limited to those described above for this embodiment of the invention and may be altered appropriately whenever necessary.

Example of Display of Reproduction List

Now, an example of display of a reproduction list will be described below. The contents data reproduction apparatus 1 can schematically display a reproduction list on the display section 3 by means of an animated image or a still image so that the user may intuitively grasp the sets of audio contents and their specific gravities.

Figure 4:
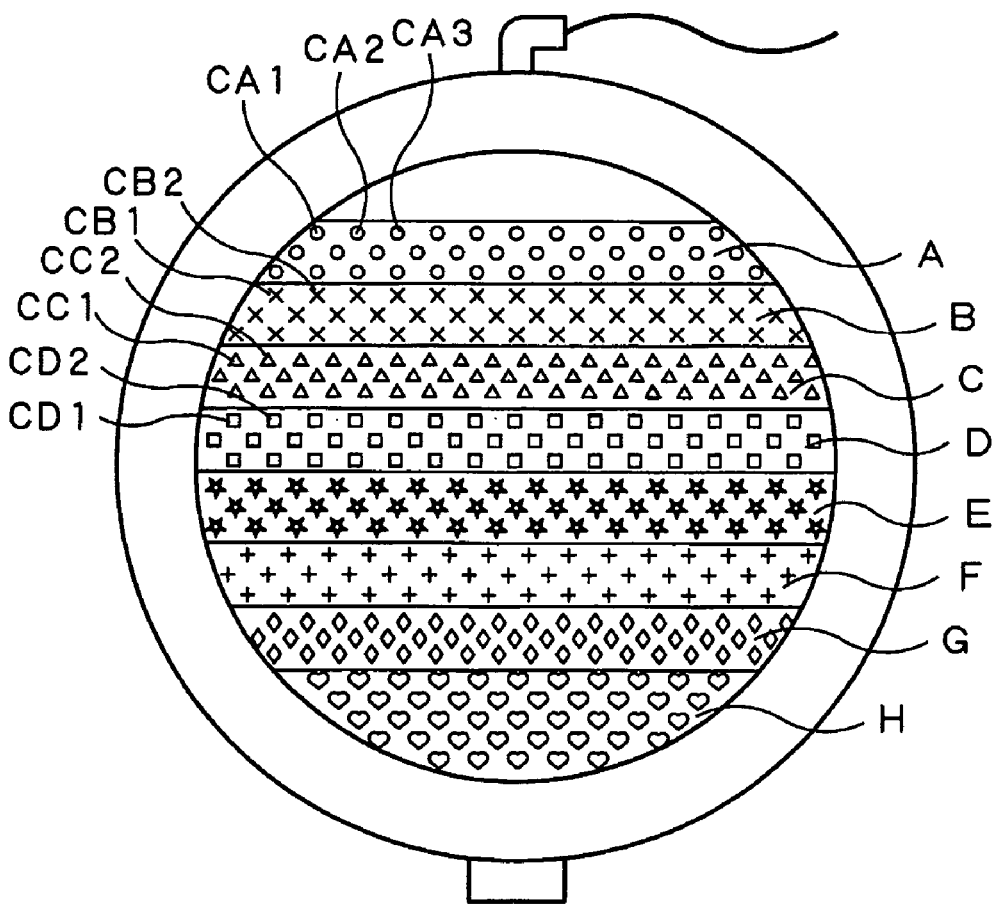
FIG. 4 is a schematic illustration of a reproduction list that can be displayed on the display section of the contents data reproduction apparatus of FIG. 1A.

A reproduction list is displayed in a layered structure according to the parameters that indicates the specific gravities of the sets of audio contents. Parameters having specific gravities close to each other are arranged in the same layer. Assume that the contents data reproduction apparatus 1 has sets of contents data whose parameters 1.1, 1.2, 1.3, 3.2, 3.9, 4.0, 5.1 and 5.2, indicating the respective specific gravities. As shown in FIG. 4, in the reproduction list prepared from such contents data, the set of audio contents CA1 (parameter: 1.1), the set of audio contents CA2 (parameter: 1.2) and the set of audio contents CA3 (parameter: 1.3) are arranged in layer A and the set of audio contents CB1 (parameter: 3.2) is arranged in layer B, while the set of audio contents CC1 (parameter: 3.9) and the set of audio contents CC2 (parameter: 4.0) are arranged in layer C and the set of audio contents CD1 (parameter: 5.1) and the set of audio contents CD2 (parameter: 5.2) are arranged in layer D. In the layers, for example, the contents data are reproduced with priority from the left side in the drawing. For display, these layers may be separated from each other by color to be visually easily understandable for the user.

Figure 5:
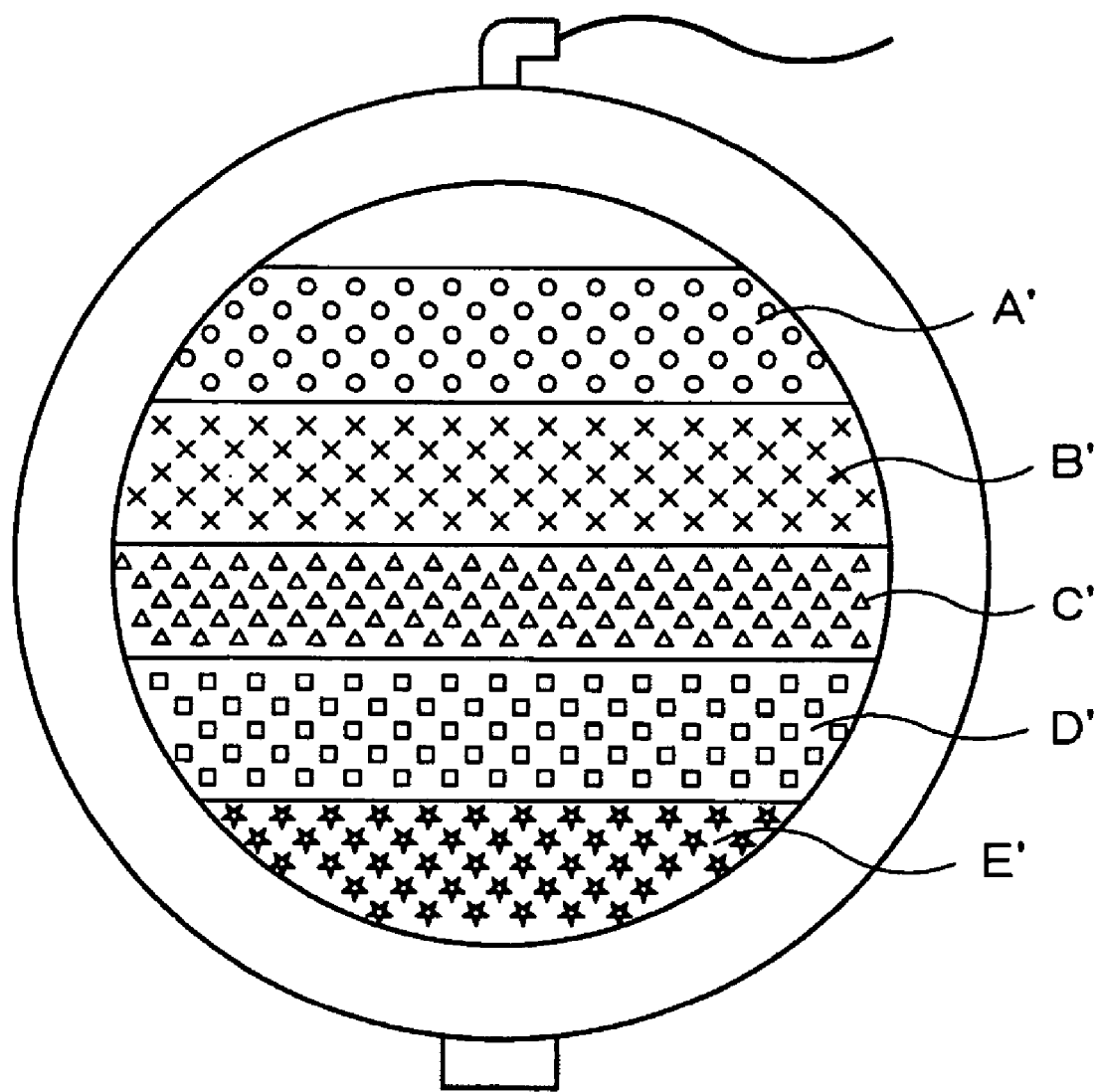
FIG. 5 is a schematic illustration of another reproduction list that can be displayed on the display section of the contents data reproduction apparatus of FIG. 1A.

The range of parameter of a category can arbitrarily be selected and the number of layers to be used for displaying the layered structure is variable. The number of sets of audio contents that belong to each layer may be expressed by the thickness of the layer as in the case of layers A', B', C', D' and E' illustrated in FIG. 5.

Recomposition of Reproduction List

The user can alter the reproduction list that defines the order in which the tunes are sequentially reproduced by applying external force to the contents data reproduction apparatus 1. Now, an operation of recomposing the reproduction list by means of an action of "shaking" as detected by the acceleration sensor 17 will be described below.

When oscillations are applied to the apparatus main body, the acceleration sensor 17 detects the oscillations. Then, the contents data reproduction apparatus 1 initializes the current reproduction list prepared according to the specific gravities of the sets of audio contents and recomposes the reproduction list according to random values that are totally unrelated to the parameters that indicate the specific gravities of the sets of audio contents. The reproduction control function section 182 initializes the current reproduction list prepared according to the parameters that indicate the specific gravities of the sets of audio contents and recomposes a new reproduction list according to the random values that indicate only positional information on the layers in the reproduction list. Therefore, as the user "shakes the apparatus main body of the contents data reproduction apparatus 1, the sets of audio contents on the former reproduction list are mixed in a manner as if they are agitated and a random reproduction list is composed without being related to the parameters that have been used.

Examples of Display of Reproduction List at the Time of Recomposition

When the main body of the contents data reproduction apparatus 1 is shaken, the apparatus 1 displays a reproduction list as a moving image that shows the sets of audio contents on the list as if they were being agitated, although it normally displays a reproduction list where the sets of audio contents are arranged in separate layers.

When the agitating motion is over and the contents data reproduction apparatus 1 has completed the operation of composing a new reproduction list according to the random values that indicate only positions of arrangement, the contents data reproduction apparatus 1 displays the new reproduction list. Alternatively, it may be so arranged that the contents data reproduction apparatus 1 displays an image showing how a new reproduction list is being composed. The displayed reproduction list can vary depending on the intensity and the duration of oscillation or the extent of shaking. When the reproduction list is hierarchically displayed according to the parameters as in the instance of this example, the reproduction control function section 182 gradually restores the values of the parameters of the contents data on the composed reproduction list before the external force is detected as a function of elapsed time. Alternatively, the reproduction control function section 182 may define the period by which the original parameters are restored to be short for those of the sets of contents data arranged in upper layers of the reproduction list.

Figure 6:
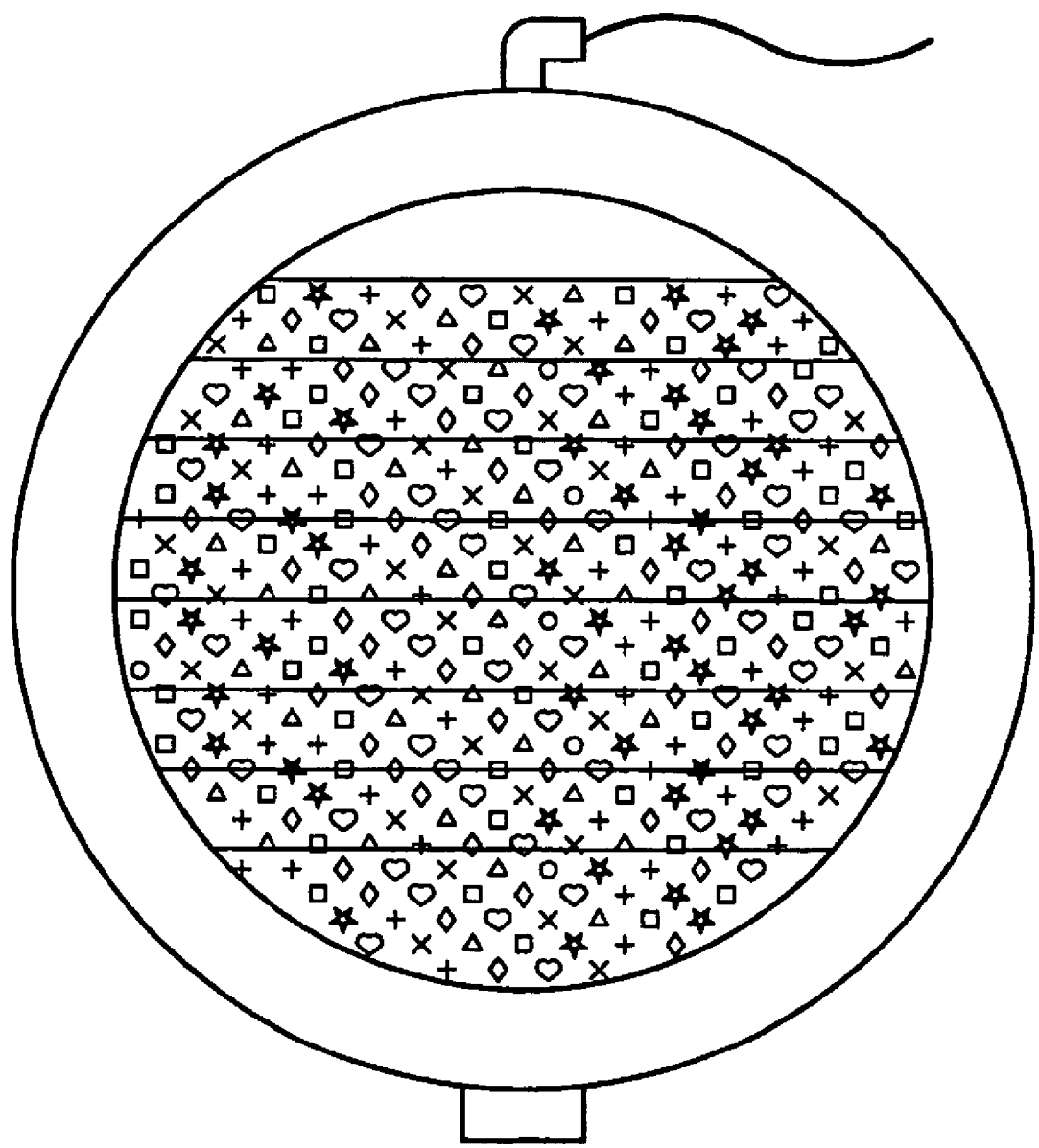
FIG. 6 is a schematic illustration of agitation of a reproduction list of the contents data reproduction apparatus of FIG. 1A.

FIG. 6 is a schematic illustration of the display section 3 visibly displaying that layers are being agitated. The dots found in the layers of the reproduction list represent so many sets of audio contents. The colors of the dots correspond to the colors of the layers. More specifically, the sets of audio contents that are indicated by a same color are those that have specific gravities found in the range of specific gravities of the layer of that color and are arranged in that layer before the agitation. The position of each dot indicates the "current position" of the set of audio contents represented by the dot that is defined according to the random value newly introduced because a motion is detected by the acceleration sensor 17.

When the apparatus main body is oscillated, the values indicating the arrangement of the sets of audio contents on the reproduction list are randomly altered to give the sets of contents arranged in lower layers on the reproduction list prepared according to the original parameters and hence having low reproduction priority an opportunity of temporarily coming up to upper layers. For example, a set of audio contents may have "specific gravity=8.4" and "current position=3.2", although the set of audio contents shows a same value for both the specific gravity and the position on the original reproduction list shown in FIG. 4, or specific gravity=8.4 and position=8.4.

Still alternatively, the category for preparing a reproduction list of this example may be selected according to the direction of the motion of the apparatus main body relative to the xyz-axes a coordinate system that is centered at the apparatus main body. For example, if the direction of the motion agrees with the x-axis, the reproduction list may be prepared on the basis of genres of music. If, on the other hand, the direction of the motion agrees with the y-axis, the reproduction list may be prepared on the basis of the artists playing the tunes. Finally, if the direction of the motion agrees with the z-axis, the reproduction list may be prepared on the basis of the albums to which the tunes belong.

When the contents data reproduction apparatus 1 is adapted to detect oscillations for the purpose of recomposing the reproduction list, the apparatus 1 may be provided with a dedicated operation button to be used to clearly indicate that the apparatus 1 is oscillated to recompose the reproduction list. Then, as the user shakes the apparatus main body after or while depressing the operation button, the apparatus 1 starts recomposing the reproduction list according to the extent of the shake.

It may additionally be so arranged that the contents data reproduction apparatus 1 emits a sound that makes the user imagine a scene where the contents data are being agitated from the time when the user start shaking the apparatus until he or she ends shaking the apparatus. For example, a crunching sound is emitted as sound effects as long as the user is shaking the apparatus main body.

Alternatively, the reproduction control function section 182 may update the reproduction list recomposed by using random values as a function of elapsed time after the recomposition and eventually restores the original reproduction list according to the original parameters after the elapse of a predetermined time period as it repeats the updating. It may be a realistic arrangement if the reproduction control function section 182 restores the sets of contents data that are found in upper layers of the reproduction list prepared according to the original parameters to the respective original positions in a relatively short period of time.

For example, the reproduction control function section 182 may specify "specific gravity=8.4" and "current position=5.1" for the status of a set of audio contents after 15 minutes as a function of elapsed time and returns to the original definition of "specific gravity=8.4" and "current position=8.4" for the status of the set of audio contents after 45 minutes. Then, each time a new specific gravity and a current position are specified, the reproduction control function section 182 prepares and displays a new reproduction list so that the user can view that the set of audio contents returns to the original layer as time goes by.

It may be so arranged that, if the intensity of oscillation as detected by the acceleration sensor 17 is not higher than a threshold value and a new reproduction list is recomposed by shuffling ten tunes out of all the ten tunes, three of them are returned to their respective original positions in the original reproduction list after 5 minutes, six of them are returned to their respective original positions in the original reproduction list after 10 minutes and all the ten tunes are returned to their respective original positions in the original reproduction list after 15 minutes. It may additionally be so arranged that, if the intensity of oscillation is detected to be near a predetermined threshold value and a new reproduction list is recomposed by shuffling ten tunes out of all the ten tunes, three of them are returned to their respective original positions in the original reproduction list after 15 minutes, six of them are returned to their respective original positions in the original reproduction list after 30 minutes and all the ten tunes are returned to their respective original positions in the original reproduction list after 45 minutes. Still additionally, it may be so arranged that, if the intensity of oscillation as detected by the acceleration sensor 17 is not lower than a threshold value and a new reproduction list is recomposed by shuffling ten tunes out of all the ten tunes, three of them are returned to their respective original positions in the original reproduction list after 30 minutes, six of them are returned to their respective original positions in the original reproduction list after 60 minutes and all the ten tunes are returned to their respective original positions in the original reproduction list after 90 minutes.

In this way, if a reproduction list is temporarily recomposed according to random values that are different from the parameters and indicate only positions of arrangement and the original reproduction list is restored after the elapse of time, it may be so devised that the sets of contents data that are arranged in upper layers on the reproduction list are returned to their respective original positions after the elapse of a short period of time.

With such an arrangement, it is possible to display a realistic image showing that liquids that are incompatible with each other and have different specific gravities are mixed with each other and agitated but gradually isolated from each other to restore the original separated state as time goes by.

It may alternatively be so arranged that the extent of shuffling sets of audio contents varies as a function of the intensity and the duration of oscillations applied to the apparatus main body in such a way that the sets of audio contents in each album are shuffled in an instance, those in each category of artists are shuffled in another instance and all the sets of audio contents are shuffled in still another instance.

For example, four different scopes may be defined for recomposing the reproduction list as a function of the duration of the detected oscillations. The reproduction list may be recomposed for the sets of audio contents in each album when the duration of the detected oscillations is about 2 seconds and it may be recomposed for the sets of audio contents in each category of artists when the duration of the detected oscillations is about 6 seconds, whereas it may be recomposed for the sets of audio contents in each album when the duration of the detected oscillations is about 6 seconds and it may be recomposed for all the sets of audio contents when the duration of the detected oscillations exceeds 8 seconds. Alternatively, the reproduction list may be recomposed only for the sets of audio contents in one or more than one layers as a function of specific gravity. For example, the reproduction list may be recomposed only for the sets of audio contents found in the layer that is being currently reproduced when the duration of the detected oscillations is about 2 seconds and it may be recomposed for the sets of audio contents found in the layer that is being currently reproduced and also in the immediately preceding and immediately succeeding layers (reproduced layer±1 layer) when the duration of the detected oscillations is about 4 seconds, whereas it may be recomposed for the sets of audio contents in the layer that is being currently reproduced and also in the immediately preceding two layers and the immediately succeeding two layers (reproduced layer±2 layers) when the duration of the detected oscillations is about 6 seconds and it may be recomposed for all the sets of audio contents when the duration of the detected oscillations exceeds 8 seconds.

It is also possible to define the extent of shuffling as a function of the intensity of the detected oscillations. For example, categories of intensity of oscillation may be defined to include weak, ordinary and strong in relative terms and the extent of shuffling may be defined as a function of the category of intensity of the detected oscillations.

A motion of the apparatus main body as detected by the acceleration sensor 17 is used as trigger for recomposing the reproduction list in the above-described examples, an operation of shaking may be utilized for altering not only the reproduction list of sets of audio contents but also the parameters of the sets of audio contents. Then, the specific gravity of each set of audio contents is updated according to the "duration" and the "intensity" of the motion of shaking the apparatus main body made by the user.

For example, it may be so arranged that the parameters of sets of audio contents are altered as specific gravities when the contents data reproduction apparatus 1 is subjected to oscillations cyclically for a long period of time as the user beats the contents data reproduction apparatus 1 on his or her own body and walks or runs. Then, the specific gravities of part of the sets of audio contents may be replaced by respective random values that indicate only positions of arrangement. With this arrangement, the specific gravities of exceptional sets of audio contents may be "modified" to produce a surprising reproduction list.

Examples of Structure and Reproduction Feature of Apparatus Main Body

This embodiment of contents data reproduction apparatus 1 is provided with various modes of operation including a shuffling mode, a reproduction mode and a deletion mode where a display of the display section 3 and an operation of the apparatus main body are combined in particular ways in addition to the above-described mode of operation of recomposing the reproduction list by way of a "shaking" action.

Figure 7:
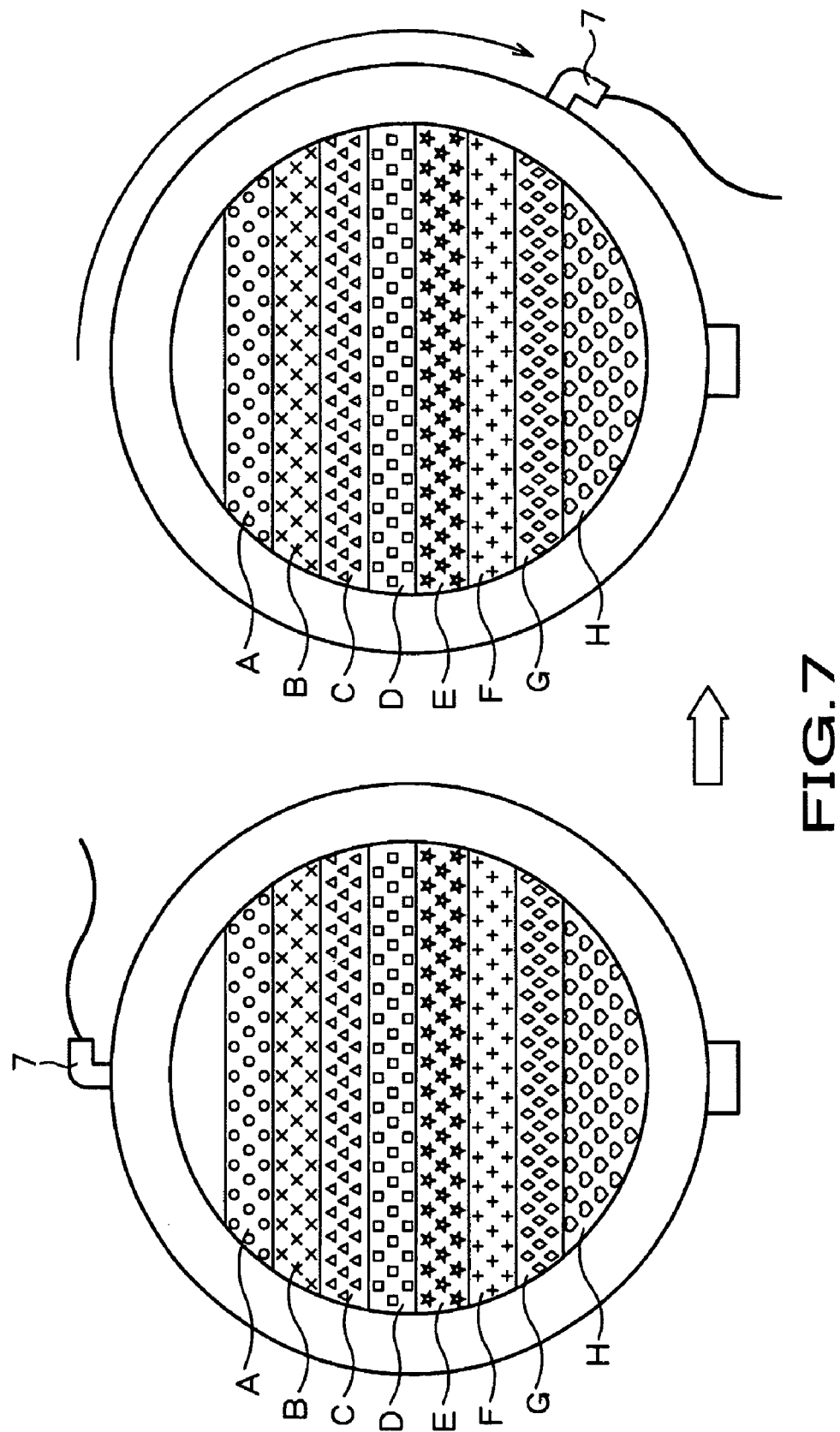
FIG. 7 is a schematic illustration of a reproduction list that can be displayed in another display mode of operation of the contents data reproduction apparatus of FIG. 1A.

An operation of the contents data reproduction apparatus 1 in a reproduction mode will be described below by referring to the related accompanying drawings. As schematically shown in FIG. 7, only the sets of audio contents contained in a layer can be reproduced by rotating the main body section 2 where the display section 3 is arranged relative to the lateral section 5 and aligning the earphone jack 7 with the desired layer that is being displayed on the display section 3. In the instance of FIG. 7, the layer A is reproduced first and, as the main body section 2 is rotated and the earphone jack 7 is aligned with the layer G, the sets of audio contents arranged in the layer G are reproduced. Alternatively, as schematically shown in FIG. 8, a mark 31 may be provided to explicitly indicate a layer to be reproduced in addition to the earphone jack 7. Then, a layer is reproduced when the mark 31 is aligned with the desired layer.

Figures 9A, 9B, 9C:
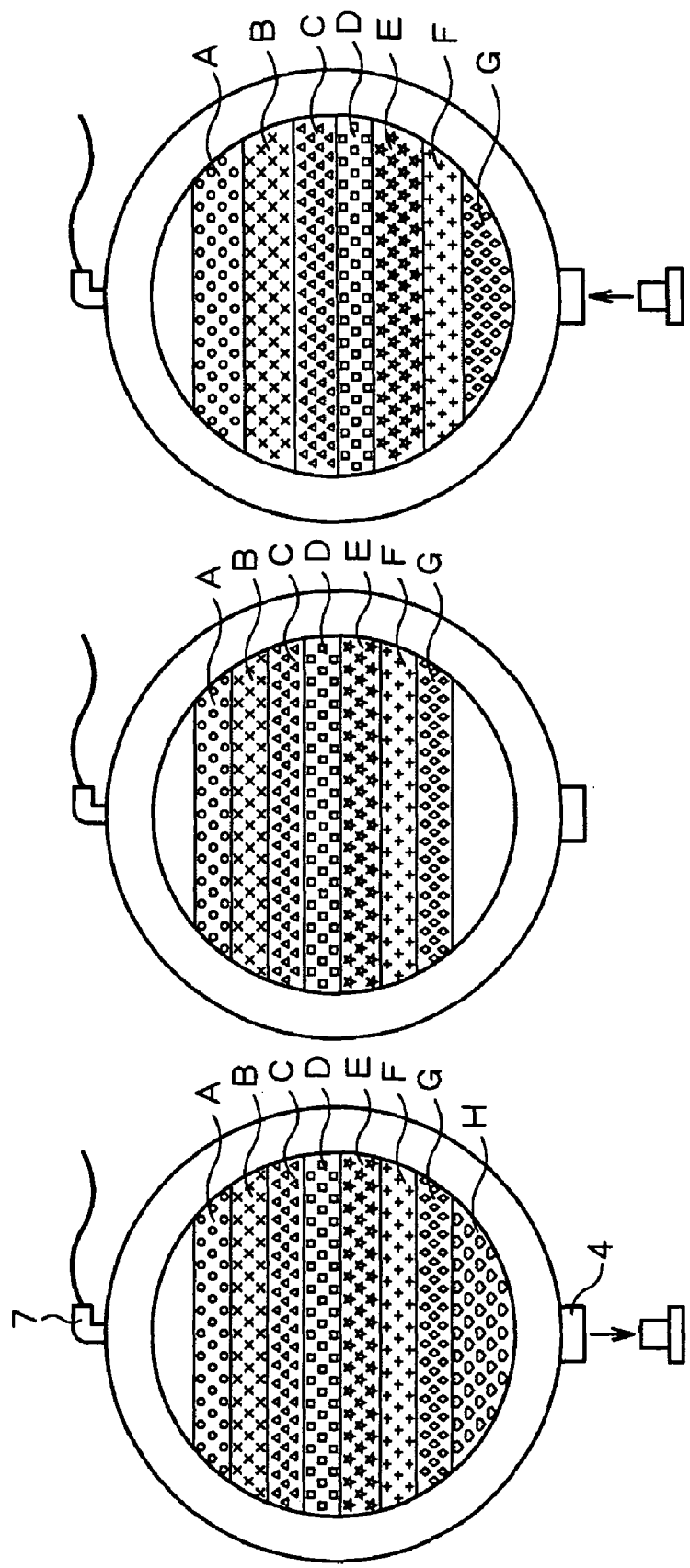
FIGS. 9A through 9C are schematic illustrations of a reproduction list that can be displayed in a deletion mode of operation of the contents data reproduction apparatus of FIG. 1A.

Now, an operation of the contents data reproduction apparatus 1 in a deletion mode will be described below by referring to the related accompanying drawings. As schematically shown in FIG. 9A through 9C, the user of the contents data reproduction apparatus 1 can delete a layer by opening the operation input section 4 that is profiled to mimic a cap that can be closed and opened. As in the case of the above-described reproduction of a selected layer, only the sets of contents data contained in a layer can be erased by rotating the main body section 2 where the display section 3 is arranged relative to the lateral section 5 and aligning the operation input section 4 with the desired layer that is being displayed on the display section 3 to open the cap. The user may recognize the "erasing" operation more intuitively if an animated image showing that the sets of audio contents contained in the layer are flowing out is displayed on the display section 3 and/or a sound is emitted for a sound effect.

In FIG. 9A, the operation input section 4 is aligned with the layer H. If the cap is removed and the apparatus main body is shaken, the lowermost layer, or the layer H, is erased as shown in FIG. 9B. Thereafter, as the cap is closed, the layers that are being displayed are smoothed as shown in FIG. 9C. The contents data reproduction apparatus 1 can switch the layer to be erased according to the detected motion of the contents data reproduction apparatus 1. For example, it may be so arranged that the single layer located next to the operation input section 4 is erased when the contents data reproduction apparatus 1 is shaken by the user vertically once, whereas the two layers located next to the operation input section 4 are erased when the contents data reproduction apparatus 1 is shaken by the user vertically twice.

Figure 10A:
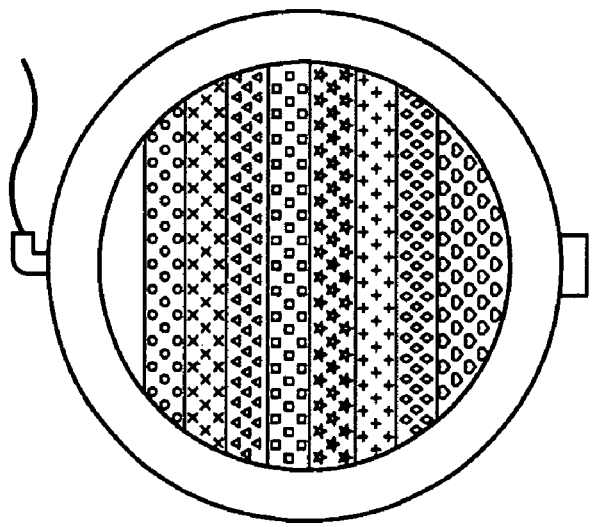
FIGS. 10A through 10C are schematic illustrations of a reproduction list that can be displayed in a shuffle mode of operation of the contents data reproduction apparatus of FIG. 1A.
Figure 10B:
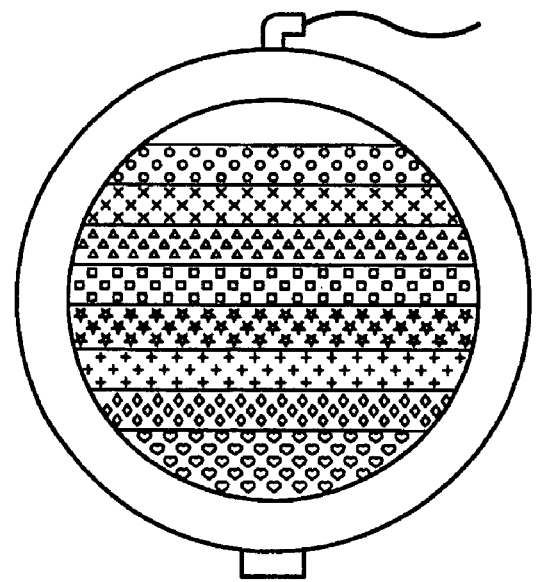
Figure 10C:
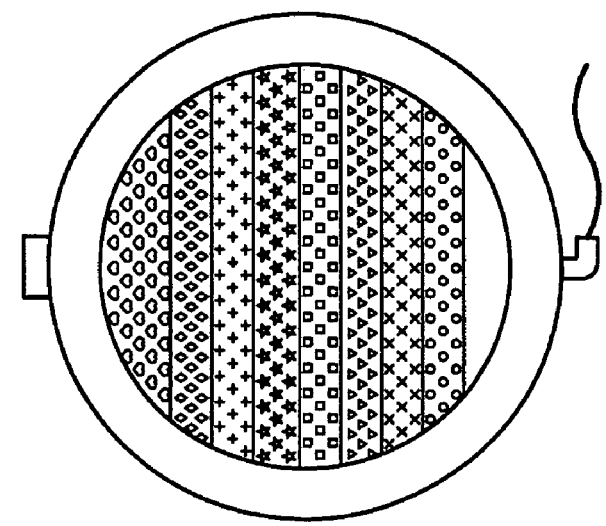

Now, an example of operation in a shuffling mode will be described by referring to FIGS. 10A through 10C. As shown in FIGS. 10A through 10C, the method of agitating contents data, or the method of recomposing the reproduction list, is altered according to the direction in which the contents data reproduction apparatus 1 is shaken. FIG. 10A illustrates that the main body of the contents data reproduction apparatus 1 is oscillated in the positive direction orthogonal relative to the layers of the reproduction list being displayed on the display section 3. Then, the values indicating the current positions of some of the sets of audio contents are exchanged among upper and lower layers. FIG. 10B illustrates that the main body of the contents data reproduction apparatus 1 is oscillated in a horizontal direction relative to the layers of the reproduction list being displayed on the display section 3. Then, the values indicating the current positions of some of the sets of audio contents are changed in the same layers. When the current positions of some of the sets of audio data are changed in the same layers, those sets of audio data whose positions of arrangement are changed by the oscillations may be highlighted to make them visually clearly recognizable. FIG. 10C illustrates that the main body of the contents data reproduction apparatus 1 is oscillated in the direction opposite to the direction of FIG. 10A and orthogonal relative to the layers of the reproduction list being displayed on the display section 3. Then, all the values indicating the current positions of all the sets of audio contents data are altered. In this way, the extent of agitation and hence the extent of recomposing the reproduction list may be altered as a function of the direction of the apparatus main body and that of oscillation of the apparatus main body in addition to or in place of the intensity and the duration of oscillations.

It is also possible to indicate the layers to be shuffled by making them blink after the apparatus main body is subjected to oscillations on the reproduction list being displayed on the display section 3 so as to make the user easily recognizable. Additionally, when audio contents are imported from the outside, an animated image showing that layers are poured into the contents data reproduction apparatus 1 through the connecting section connecting the apparatus 1 and an external apparatus may be displayed on the display section 3. Similarly, when the cap is removed to erase one or more than one sets of audio contents, an animated image showing that the layers to be deleted are flowing out of the apparatus main body may be displayed on the display section 3.

When the apparatus main body is shaken in a plurality of different directions, it is possible to display a reproduction list according to the shaking motion. Such a shaking motion may be combined with an operation of the rotary operator 6. In short, the above listed modes of operation are only examples and the present invention is by no means limited thereto.

Thus, as described above in detail, a reproduction list of contents data is composed according to the weighting information including contents information relating to the contents data and information on the use of the contents data and indicating the reproduction priority for the contents data and visibly displayed and then recomposed by detecting the external force, if any, applied to the apparatus main body of a contents data reproduction apparatus according to the embodiment of the invention. Therefore, for example, the order of reproducing tunes of music can be arranged when the user "shakes" the apparatus main body. With the above-described arrangement, it is possible for the user to easily recompose the reproduction list for reproducing the contents data recorded in the apparatus by means of an intuitive action with which the user may feel as if he or she were agitating the inside of the apparatus. Additionally, according to the embodiment of the present invention, since it is possible to visibly display the reproduction list for reproducing the contents data recorded in the recording medium, the user can operate the contents data reproduction apparatus in a more intuitive manner.

It should be understood by those skilled in the art that various modifications, combinations, sub-combinations and alterations may occur depending on design requirements and other factors insofar as they are within the scope of the appended claims or the equivalents thereof.

What is claimed is:

1. A contents data reproduction apparatus for reproducing contents data from a computer-readable storage medium storing contents data, the apparatus comprising:
    an acceleration detector that detects an acceleration of the contents data reproduction apparatus;
    weighting information generating means for generating weighting information including contents information relating to the contents data and information on the use of the contents data and indicating a reproduction priority for the contents data;
    a memory that stores the weighting information;
    a reproduction control section that composes a playlist of the contents data in an order according to the weighting information;
    a reproduction section that reads out the contents data and reproduces the contents data according to the playlist; and
    a display section that visibly displays the playlist,
    the reproduction control section:
        modifying the weighting information based on the detected acceleration;
        reordering the order of the contents data in the playlist based on the modified weighting information and storing the reordered playlist in the memory; and
        visibly displaying the reordered playlist on the display section.

2. The apparatus according to claim 1, wherein the playlist has a hierarchical structure and contents data having more heavily weighted information are arranged in upper layers.

3. The apparatus according to claim 1, wherein the reproduction control section introduces random values unrelated to the weighting information and reorders the playlist based further on the random values.

4. The apparatus according to claim 3, wherein the reproduction control section reorders the playlist by changing the random values as a function of the elapsed time since the reordering and restores the playlist according to the original weighting information after a predetermined period of time.

5. The apparatus according to claim 4, wherein the reproduction control section defines the time period until the restoration of the playlist to be shorter for contents data arranged in upper levels of the playlist according to the original weighting information.

6. The apparatus according to claim 1, wherein the weighting information generating means modifies the weighting information by a predetermined value and uses the modified weighting information as new weighting information when all of the contents data has been reproduced.

7. The apparatus according to claim 1, wherein the weighting information generating means modifies the weighting information by a predetermined value and uses the modified weighting information as new weighting information when a part of the contents data has been reproduced.

8. The apparatus according to claim 1, wherein the weighting information generating means modifies the weighting information as a function of the time period during which the detected acceleration occurs or as a function of the intensity of the detected acceleration by a predetermined value and uses the modified weighting information as new weighting information.

9. A contents data reproduction method of a contents data reproduction apparatus for reproducing contents data from a computer-readable storage medium storing contents data, the method comprising:
    detecting, by an acceleration sensor, a duration of an acceleration of the contents data reproduction apparatus, or an intensity of the acceleration;
    generating weighting information including contents information relating to the contents data and information on the use of the contents data and indicating the reproduction priority for the contents data;
    composing a playlist for the contents data in an order according to the weighting information;

reading out and reproducing the contents data according to the playlist;

displaying the playlist on a display section;

modifying the weighting information based on at least one of the duration and the intensity of the detected acceleration; and reordering the order of the contents data in the playlist based on the modified weighting information and storing the reordered playlist in a memory.

10. The method according to claim 9, wherein reordering the playlist comprises irregularly reordering the playlist.

11. A contents data reproduction apparatus for reproducing contents data from a computer-readable storage medium storing contents data, the apparatus comprising:

an acceleration detecting section that detects a duration or an intensity of acceleration of the contents data reproduction apparatus;

a weighting information generating section that generates weighting information including contents information relating to the contents data and information on the use of the contents data and indicating the reproduction priority for the contents data;

a memory storing the weighting information;

a reproduction control section that composes a playlist of the contents data in an order according to the weighting information;

a reproduction section that reads out the contents data and reproduces the contents data according to the playlist; and a display section that visibly displays the playlist, the reproduction control section:

modifying the weighting information based on at least one of the duration and the intensity of the detected acceleration;

reordering the order of the contents data in the playlist based on the modified weighting information and storing the reordered playlist in the memory; and visibly displaying the reordered playlist on the display section.

* * * * *